United States Patent [19]
Kobayashi et al.

[11] Patent Number: 5,239,742
[45] Date of Patent: Aug. 31, 1993

[54] METHOD OF MANUFACTURING A MOTOR

[75] Inventors: Toshiji Kobayashi; Hatsuo Kitahara; Kiyoshi Wakai, all of Iidashi, Japan

[73] Assignee: Sankyo Seiki Mfg. Co., Ltd., Nagano, Japan

[21] Appl. No.: 810,477

[22] Filed: Dec. 19, 1991

[30] Foreign Application Priority Data
Dec. 20, 1990 [JP] Japan .................. 2-413151

[51] Int. Cl.⁵ .............................. H02K 15/04
[52] U.S. Cl. ........................ 29/596; 29/605; 264/272.2
[58] Field of Search .............. 29/596, 598, 605; 264/272.2, 251; 310/49 R, 49 A, 42, 43

[56] References Cited
U.S. PATENT DOCUMENTS

| | | | |
|---|---|---|---|
| 4,182,026 | 1/1980 | Searle | 29/596 |
| 4,312,119 | 1/1982 | Perucchi et al. | 29/596 |
| 4,926,540 | 5/1990 | Kato | 29/596 |

*Primary Examiner*—Carl E. Hall
*Attorney, Agent, or Firm*—McAulay Fisher Nissen Goldberg & Kiel

[57] ABSTRACT

A method of manufacturing a motor comprises the steps of punching intermediary products of stator cores out of steel bands along profile lines with the intermediary products partly connected to the steel bands, forming wire winding frames of synthetic resin around magnetic core pieces of the intermediary products of stator cores as integral parts thereof, separating the intermediary products of stator cores carrying integrally formed wire winding frames from the steel bands, winding wires around the wire winding frames to form excitation coils and assembling the stator cores and the rotors in a case so that the magnetic pole pieces are juxtaposed with said rotors. With such a method, wire winding frames are formed around magnetic pole pieces of a plurality of intermediary products for stator cores produced by punching as integral parts. Thereafter, a set of intermediary products are separated to produce an independent stator core assembly. Then wires are wound around the wire winding frames of the stator core assembly and rotors are arranged in juxtaposition with the magnetic pole pieces of the stator core assembly to complete the manufacturing process and produce a finished motor.

4 Claims, 4 Drawing Sheets

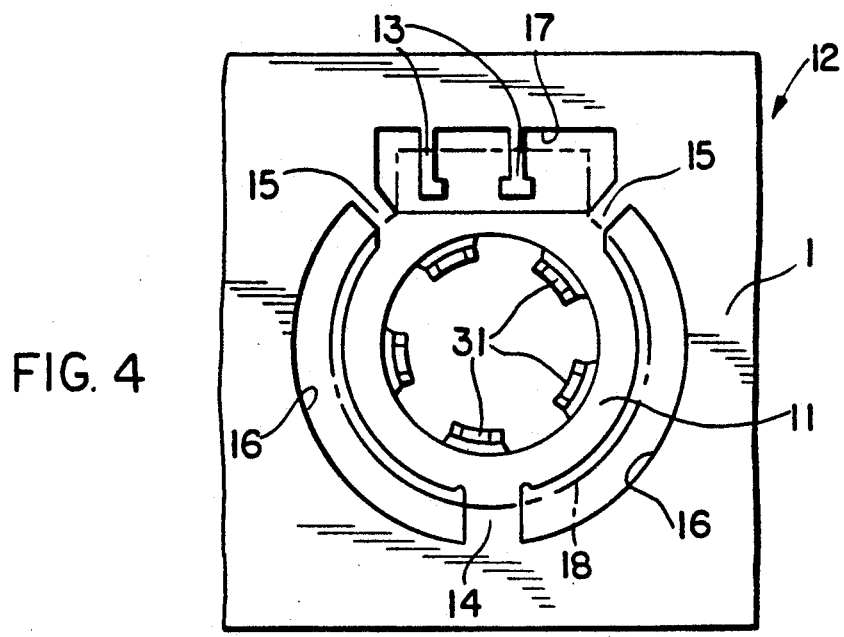
FIG. 4
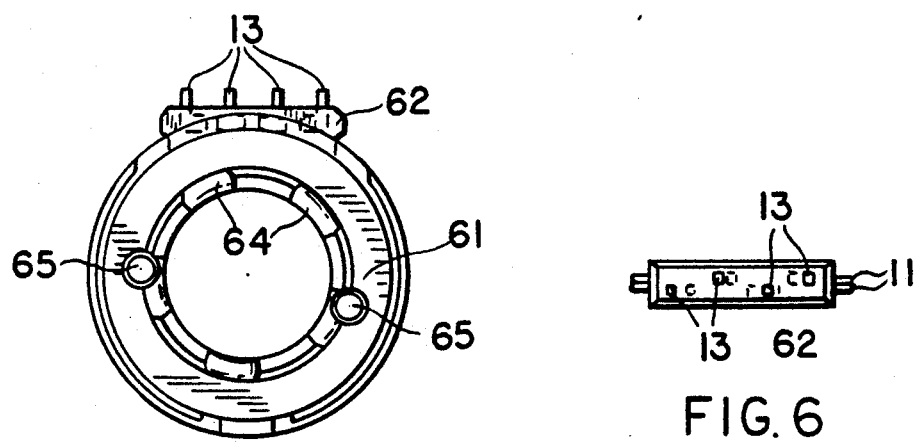
FIG. 5
FIG. 6
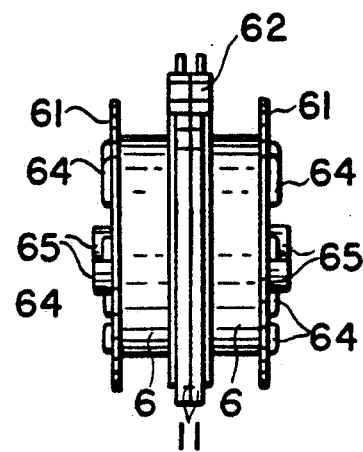
FIG. 7

METHOD OF MANUFACTURING A MOTOR

BACKGROUND OF THE INVENTION

1. Field of the Invention

This invention relates to a method of manufacturing a motor by surrounding magnetic pole pieces of stator cores with wire winding frames of synthetic resin integrally formed with such cores.

2. Prior Art

A method is known for manufacturing a motor, for instance, a conventional permanent magnet type stepping motor, by putting a plurality of cores provided with pole ridges together into a certain number of layers and forming wire winding frames around the pole ridges as an integral part thereof. Similarly, a technique of arranging and rigidly holding terminals around wire winding frames prepared in the manner described above is also known. Such technique is disclosed, for instance, in Japanese Patent Hei No. 2-27909.

Such techniques are, however, accompanied by certain drawbacks. One of the drawbacks is that, when wire winding frames are formed around pole ridges of a plurality of cores as integral parts thereof, the cores should be placed in respective metal molds properly keeping their positional relationship. This involves complicated steps of operation that are very difficult to automate. Besides, pole ridges impose difficult handling problems particularly if very small pole ridges are required since small pole ridges can easily be deformed in the manufacturing process. Moreover, since the therminials for the motor are prepared as a number different parts that should be press fit to wire winding frames, they can accidentally come off to make the motor inoperable and useless.

OBJECTS OF THE INVENTION

In view of the above problems of the known methods, it is therefore a primary object of the present invention to provide a method of manufacturing a motor with which cores can be easily arranged, keeping their proper positional relationship, when wire winding frames are formed around pole ridges of a plurality of cores as integral parts thereof and the number of components can be significantly reduced.

Another object of the invention is to provide a method of manufacturing a motor with which terminals do not need to be press fit and at the same time rigidly held in position so that they would not come off to make the motor inoperable.

SUMMARY OF THE INVENTION

According to a first aspect of the invention, the above objects are achieved by providing a method of manufacturing a motor comprising steps of punching intermediary products of stator cores out of steel bands along profile lines with the intermediary products partly connected to the steel bands, forming wire winding frames of synthetic resin around magnetic core pieces of the intermediary products of stator cores as integral parts thereof, separating the intermediary products of stator cores carrying integrally formed wire winding frames from the steel bands, winding wires around the wire winding frames to form excitation coils and assembling the stator cores and the rotors in a case so that the magnetic pole pieces are juxtaposed with the rotors.

According to a second aspect of the invention, there is provided a method of manufacturing a motor comprising steps of punching intermediary products of stator cores and terminals to be used for energizing excitation coils of the motor out of steel bands along profile lines with the intermediary products partly connected to the steel bands, forming wire winding frames of synthetic resin around magnetic core pieces of the intermediary products of stator cores as integral parts thereof with the terminals partly buried in the frames, separating the intermediary products of stator cores carrying integrally formed wire winding frames and terminals from the steel bands, winding wires around the wire winding frames to form excitation coils and assembling the stator cores and the rotors in a case so that the magnetic pole pieces are juxtaposed with the rotors.

With a method according to the first aspect of the invention, wire winding frames are formed around magnetic pole pieces of a plurality of intermediary products for stator cores produced by punching as integral parts. Thereafter, a set of intermediary products are separated to produce an independent stator core assembly. Then wires are wound around the wire winding frames of the stator core assembly and rotors are arranged in juxtaposition with the magnetic pole pieces of the stator core assembly to complete the manufacturing process and produce a finished motor.

With a method according to the second aspect of the invention, terminals are simultaneously formed with related intermediary products by punching and buried in wire winding frames that are formed as integral parts of the intermediary products. At a subsequent separating step, the terminals are separated from unnecessary parts.

For a better understanding of the present invention, reference is made to the following description and accompanying drawings while the scope of the invention will be pointed out in the appended claims.

BRIEF DESCRIPTION OF THE DRAWINGS

FIG. 4 is a plan view of an intermediary product produced at a step subsequent to that of FIG. 2.

FIG. 5 is a plan view of a stator core assembly nearly completed in the manufacturing process.

FIG. 6 is a side view of the terminals of the stator core assembly of FIG. 5.

FIG. 7 is a side view of the stator core assembly.

DETAILED DESCRIPTION OF THE PREFERRED EMBODIMENT

Figure 1:
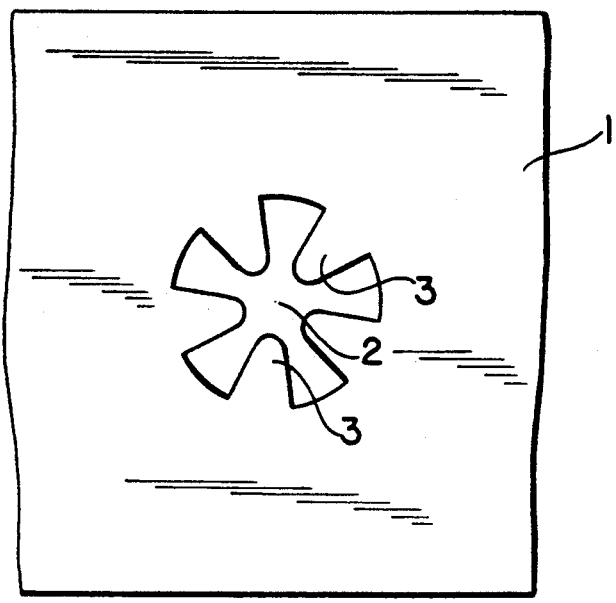
FIG. 1 is plan view of a semi-manufactured product produced at a step of the method of manufacturing a motor according to the invention.
Figure 2:
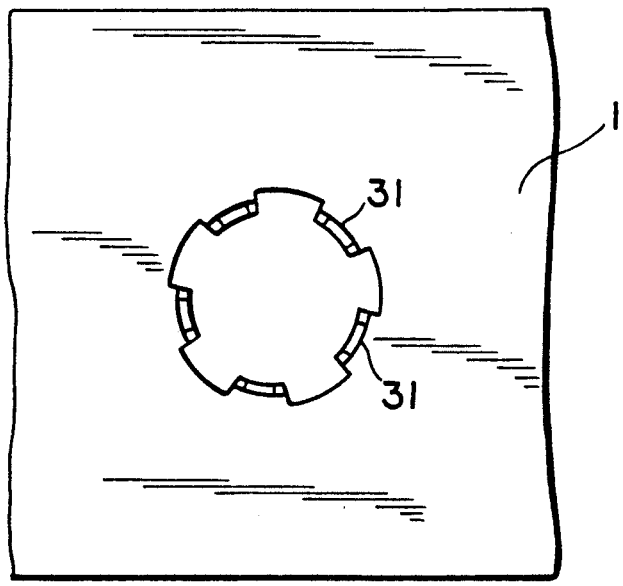
FIG. 2 is a plan view of a semi-manufactured product at a step subsequent to that of FIG. 1.

In FIG. 1, reference numeral 1 denotes a steel band 1 that provides the base material for stator cores. Multipetalous openings 2 are formed by punching out the steel band 1 at a given pitch, of which only one is shown in FIG. 1. Each of a set of projections 3 directed to the center of a multipetalous opening of the steel band 1 has a profile suitable to produce a magnetic pole piece when bent at the next step of the manufacturing process. The projections 3 of an opening are angularly spaced apart at a uniform pitch around the opening.

Each of the projections 3 of the steel band 1 is bent perpendicularly to the surface of the steel band 1 to form a magnetic pole piece 31. Two steel bands 1 provided with a number of magnetic pole pieces 31 form a pair. The paired steel bands 1 are so arranged that, when they are put together back to back, the magnetic pole pieces of an opening of one of the steel bands 1 is angularly displaced by a given angle relative to the corresponding ones of the other steel band 1.

Figure 3:
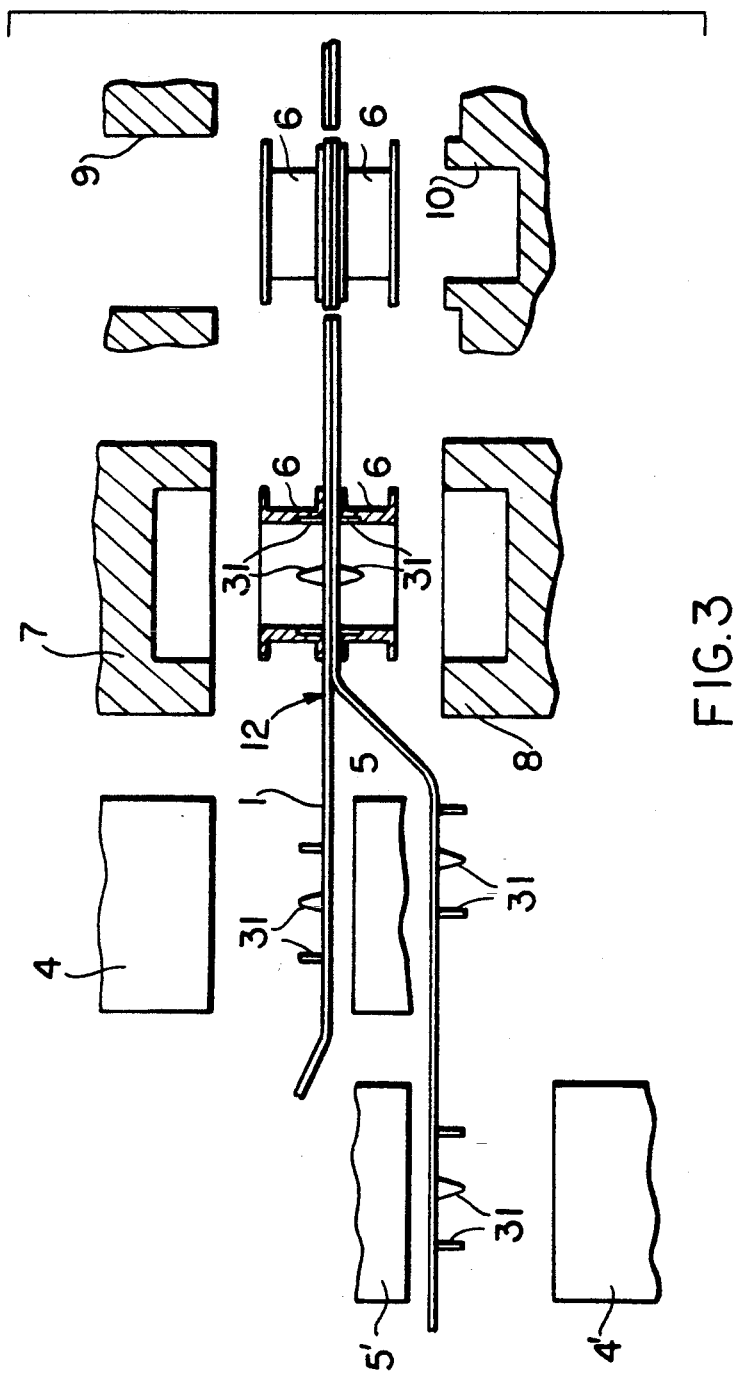
FIG. 3 is a sectional side view of a line embodying the method of the invention, showing three successive steps.

FIG. 4 shows an intermediary product 12 produced by a press operation using metal press molds 4, 5, 4' and 5' as shown in FIG. 3. It has a pair of arc-shaped apertures 16, 16 arranged oppositely relative to an opening 2 and a differently shaped third aperture 17 so that the adjoining ends of the pair of arc-shaped apertures 16, 16 are separated by a bridge section 14, while the other ends of the arc-shaped apertures 16, 16 and the two ends of the third aperture 17 are separated by respective bridge sections 15, 15. The plurality of magnetic pole pieces 31 arranged around the opening 2, the arc-shaped apertures 16, 16 and the third aperture 17 surrounding the magnetic pole pieces 31 define a portion 11 that constitutes a stator core when the manufacturing process is over. A plurality of projections 13 that make a number of terminals to be connected to a coiled excitation wire are directed from the outer edge toward the inner edge of the third opening. The free end of each of the projections 13 is shaped as a hook. It should be noted that the portion 11 that constitutes a stator core and the projections 13 that make terminals are held to the steel band 1 by the bridge sections 14, 15, 15 and not separated from it at this stage. The three bridge sections may be replaced by only one bridge section.

A pair of steel bands 1, 1 processed to this stage are then put together back to back so that their magnetic pole pieces 31 are directed outward as shown in FIG. 3.

Note that the steel bands 1, 1 can be tightly put together as the pair of metal molds 4, 5 and the other pair of metal molds 4', 5' are displaced from each other by a distance equal to the length of an intermediary product 12.

An intermediary product 12 of one of the steel bands 1 and a corresponding intermediary product 12 of the other steel band 1 are brought together to form a pair, which are then processed to form a unit whose magnetic pole pieces 31 are enclosed by a pair of wire winding frames 6, made of synthetic resin as shown at the center of FIG. 3. Reference numerals 7 and 8 in FIG. 3 denote a pair of metal molds for molding wire winding frames 6, 6 of synthetic resin. The plastic resin used to form a pair of wire winding frames 6, 6 partly runs into the third aperture 17 to bury the front ends of the terminals 13 in it. Thus, the pair of intermediary products 12, 12 are tightly held together to form a unit by the synthetic resin of the wire winding frames 6, 6. Note that the wire winding frames 6, 6 are prepared for each of the intermediary product 12, 12 and each of the frames 6, 6 is provided with a flange 61 which is integrally formed with the frame 6 and arranged at its axially remote end as shown in FIG. 7.

An assembled unit comprising a pair of intermediary products 12, 12 and a pair of wire winding frames 6, 6 is then led to a separating step as shown at the right end in FIG. 3. Reference numerals 9 and 10 in FIG. 3 denotes a pair of separator metal molds. In this separating step, each unit comprising a pair of intermediary products 12, 12 is separated from the steel bands 1 by cutting the bridge sections 14, 15, 15 and the terminals 13, which are therefore partly left on the steel band 1. The chain line in FIG. 3 indicates the cutting line along which the bridges are cut to separate the unit from the steel bands in this separating step.

FIGS. 5 and 7 show a stator assembly produced by the separating step and having a pair of wire winding frames 6, 6, a pair of flanges 61, 61 and a terminal holder section 61 holding the terminals 13, which are integral with one another. As the terminals 13 are separated in a manner as described above, they are electrically independent from one another while they are firmly held by a single terminal holder section 62 and partly project out of it. The outer surface of each of the flanges 61, 61 is provided with projections 64 to be used for axial alignment of a case of the stator and also with projections 65 for radial alignment of the case, which will be described later.

Figure 9:
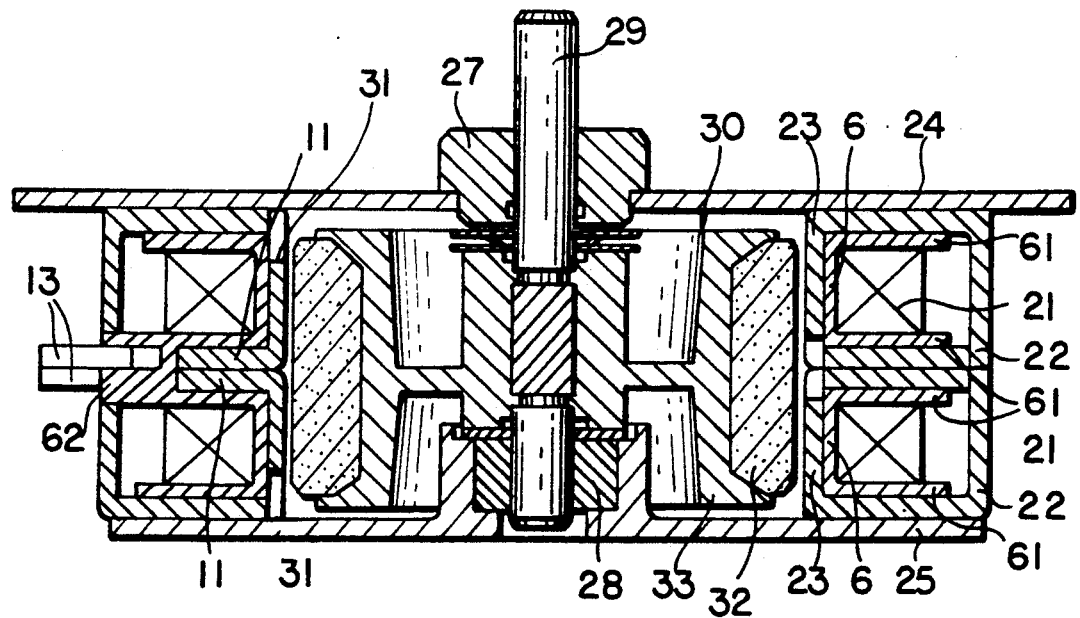
FIG. 9 is a cross-sectional view of a stepping motor.

An assembled stator unit prepared in a manner as described above is then subjected to a step of winding wires to form excitation coils and a subsequent step of arranging it in a case so that a complete motor is produced when rotors are arranged in juxtaposition with the respective magnetic pole pieces 31 within a case that houses the assembly. FIG. 9 shows a sectional view of a motor produced in this manner.

Referring to FIG. 9, a stator assembly comprises a pair of stator cores 11, each prepared from an intermediary product 12, a number of magnetic pole pieces 31 of the stator cores 11, a pair of integrally formed wire winding frames 6, 6 enclosing the magnetic pole pieces 31, a pair of flanges 61, a number of terminals 13 and a single terminal holder section 62. After winding wires around the wire winding frames to form excitation coils 21, the stator assembly is housed in a case constituted by a pair of case members 22 as the separate case members 22 surrounding the respective stator cores are pressed from the axially opposite sides. Therefore, each case member 22 is provided with a number of magnetic pole pieces 23 formed in a manner similar to that where the magnetic pole pieces 21 are formed. Each of the magnetic pole pieces 23 are put between a pair of adjacent magnetic pole pieces 21 of the stator core 11 so that the magnetic pole pieces 21 of the stator core 11 and the magnetic pole pieces 23 of the case member 22 are alternately arranged around the same circle to form a finished product of stator assembly.

The case of the stator assembly is provided with a fitting plate 24 and a bottom plate 25. The fitting plate 24 and the bottom plate 25 are provided with respective bearings 27 and 28 to receive a rotary shaft 29. The rotary shaft carries on it a rotor 30 as an integral part thereof. Rotor 30 comprises a rotor holder 33 and a number of rotor magnets 32 rigidly fitted to the outer peripheral wall of the rotor holder 33. The rotor magnets 32 are spaced apart from the adjacent ones and alternately have opposite polarities. The outer peripheral wall of the rotor 30 faces the magnetic pole pieces 31, 32 of the stator cores 11 and the case members 22, or more precisely the outer surface of each of the rotor magnets 32 faces one of the magnetic pole pieces 31, 32 of the stator cores 11 and the case members 22. Thus, permanent magnet type stepping is realized by the above described components which are arranged in a manner as described above. The way such a stepping motor operates is well known and therefore does not require any further explanation.

To summarize the method of manufacturing a stator core assembly according to the invention is described above by way of an embodiment where, firstly a pair of intermediary products 12, 12 of stator cores 11, 11 are prepared from steel bands 1, using a punching technique, and a pair of wire winding frames 6, 6 are formed to surround the magnetic pole pieces 31 of the intermediary products 12, 12 of the stator cores 11, 11 to form a firmly assembled unit. Thereafter, the bridge sections 14, 15, 15 of the intermediary products 12, 12 are cut to remove any unnecessary parts from the intermediary products 12, 12 having wire winding frames 6, 6 to produce a stator core assembly. Therefore, stator core assemblies produced from same pair of steel bands can remain on the steel bands until the completion of the manufacturing process. This by turn makes it easy to handle the stator cores on the line and prevents any unintended and undesired damages to the magnetic pole pieces 31. Moreover, each pair of stator cores on the steel bands can be aligned simply by aligning the steel bands and therefore wire winding frames 6 can be easily and accurately formed around stator cores.

Besides, since portions of a steel band 1 for terminals 13 are buried in the synthetic resin used for forming wire winding frames 6 and thereafter cut to form separate terminals, these terminals 13 do not need to be prepared separately as a number of parts and can easily become integral parts of stator core assemblies. Additionally, terminals 13 to be buried in synthetic resin can take any desired shape to prevent their coming out of the hardened synthetic resin.

Figure 8:
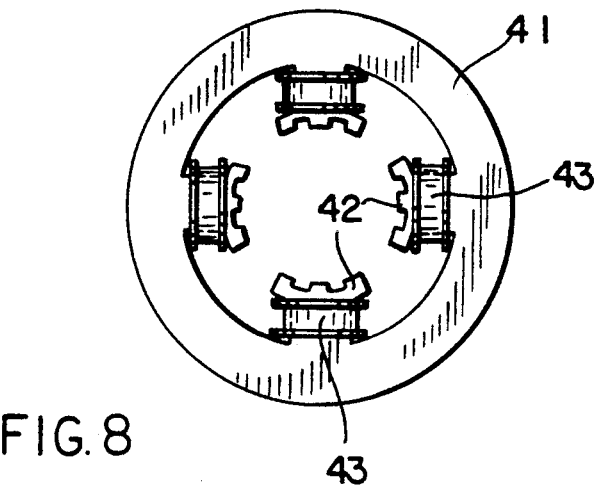
FIG. 8 is a plan view of a stator core assembly of a hybrid type stepping motor.

While the above embodiment was described in terms of a permanent magnet type stepping motor, the method of the present invention can be applied to manufacturing a hybrid type stepping motor. FIG. 8 illustrates a hybrid type stepping motor prepared by the method of the invention. Here, a plurality of stator cores 41 each having a number of magnetic pole pieces 42 projecting toward the center of an opening are put together to form a multi-layered structure. As in the case of the above embodiment, a plurality of steel bands used for producing such stator cores are at least partly fastened together before the profiles of intermediary products are defined by means of a punching out technique. Then, the magnetic pole pieces 42 of the layered intermediary products of a stepping motor are surrounded by molded wire winding frames 43 at the base to become a stator core assembly. Wires are wound around the wire winding frames 43 in the wire winding step and rotors are arranged inside the magnetic pole pieces 42 in the subsequent assembling step. Thereafter, the stator assembly is put into a case and the rotors are rearranged so that they are properly juxtaposed with the corresponding respective magnetic pole pieces 42. Such an arrangement of a hybrid type stepping motor is as effective as the embodiment described earlier.

It may be appreciated that the method of the present invention is also applicable to motors of other types.

While a pair of long and continuous steel bands 1 are used up to the final stage of the manufacturing process for the above embodiment, the steel bands 1 may be alternatively cut each time, for instance, eight intermediary products are formed on each steel band so that the stripes of steel each carrying eight intermediary products may be put together back to back manually or by means of a robot. With such an arrangement, the use of the metal molds 4', 5' may be omitted.

Thus, according to the first aspect of the invention, since intermediary products of stator cores are formed by punching steel bands and wire winding frames of synthetic resin are formed around the magnetic pole pieces of the intermediary products before the stator cores are cut and separated from the steel bands, the stator core assemblies produced from same pair of steel bands can remain on the steel bands until the completion of the manufacturing process. This by turn makes it easy to handle the stator cores on the line and prevents any unintended and undesired damages to the magnetic pole pieces 31. Moreover, each pair of stator cores on the steel bands can be aligned simply by aligning the steel bands and therefore wire winding frames can be easily and accurately formed around stator cores.

According to the second aspect of the invention, since portions of a steel band for terminals are buried in the synthetic resin used for forming wire winding frames and thereafter cut to form separate terminals, these terminals do not need to be prepared separately as a number of parts and can easily become integral parts of stator core assemblies. Additionally, terminals to be buried in synthetic resin can take any desired shape so as to be prevented from coming out of the hardened synthetic resin.

While the foregoing description and drawings represent the preferred embodiments of the present invention, it will be obvious to those skilled in the art that various changes and modifications may be made therein without departing from the true spirit and scope of the present invention.

What is claimed is:

1. A method of manufacturing a motor having rotors, stator cores having magnetic pole pieces arranged in juxtaposition with the rotors and surrounded by wire winding frames and excitation coils of wires wound around said wire winding frames, comprising the steps of:

punching intermediary products of stator cores out of steel bands along profile lines with said intermediary products partly connected to said steel bands;

combining pairs of steel bands back-to-back so that said intermediate products on said bands are aligned and each have magnetic core pieces extending outwardly from a corresponding band;

forming wire winding frames of synthetic resin around magnetic core pieces of said intermediary products of stator cores as integral parts thereof;

separating said intermediary products of stator cores carrying integrally formed wire winding frames from said steel bands;

winding wires around said wire winding frames to form excitation coils; and assembling the stator cores and the rotors in a case so that said magnetic pole pieces are juxtaposed with said rotors.

2. A method of manufacturing a motor having rotors, stator cores having magnetic pole pieces arranged in juxtaposition with the rotors and surrounded by wire winding frames and excitation coils of wire wound around the wire winding frames comprising the steps of:

punching intermediary products of stator cores and terminals to be used for energizing excitation coils of the motor out of steel bands along profile lines with said intermediary products partly connected to said steel bands;

combining pairs of steel bands back-to-back so that said intermediate products on said bands are aligned and each have magnetic core pieces extending outwardly from a corresponding band;

forming wire winding frames of synthetic resin around magnetic core pieces of said intermediary products of stator cores as integral parts thereof with said terminals partly buried in said frames;

separating said intermediary products of stator cores carrying integrally formed wire winding frames and terminals from said steel bands;

winding wires around said wire winding frames to form excitation coils; and assembling the stator cores and the rotors in a case so that said magnetic pole pieces are juxtaposed with said rotors.

3. The method of claim 1 including the step of bending portions of a punched steel band so that when said steel bands are combined, the outwardly extending magnetic core pieces of one intermediate product is angularly displayed by a given angle relative to the outwardly extending magnetic core pieces of the corresponding intermediate product aligned therewith.

4. The method of claim 2 including the step of bending portions of a punched steel band so that when said steel bands are combined, the outwardly extending magnetic core pieces of one intermediate product is angularly displayed by a given angle relative to the outwardly extending magnetic core pieces of the corresponding intermediate product aligned therewith.

* * * * *